UNITED STATES PATENT OFFICE.

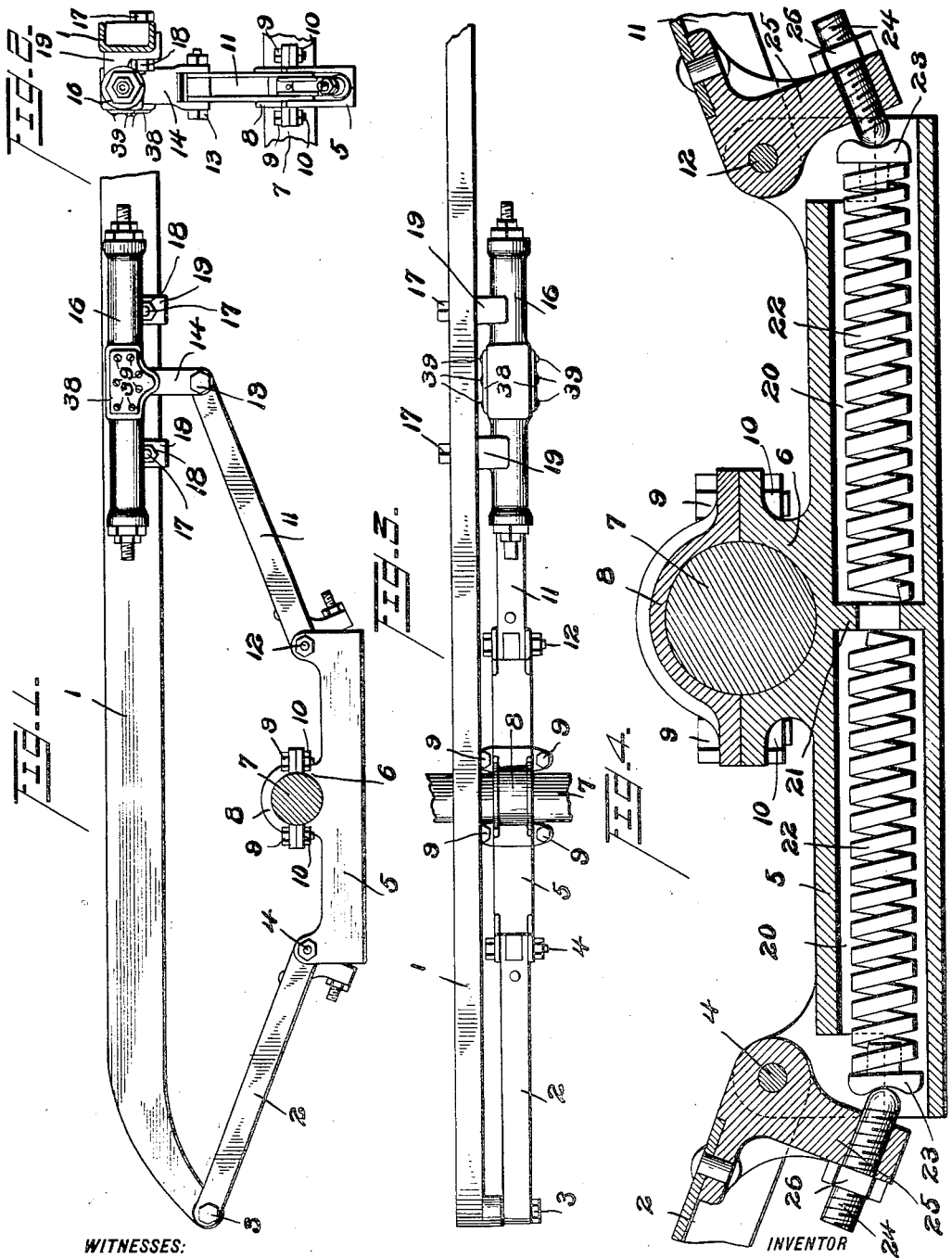

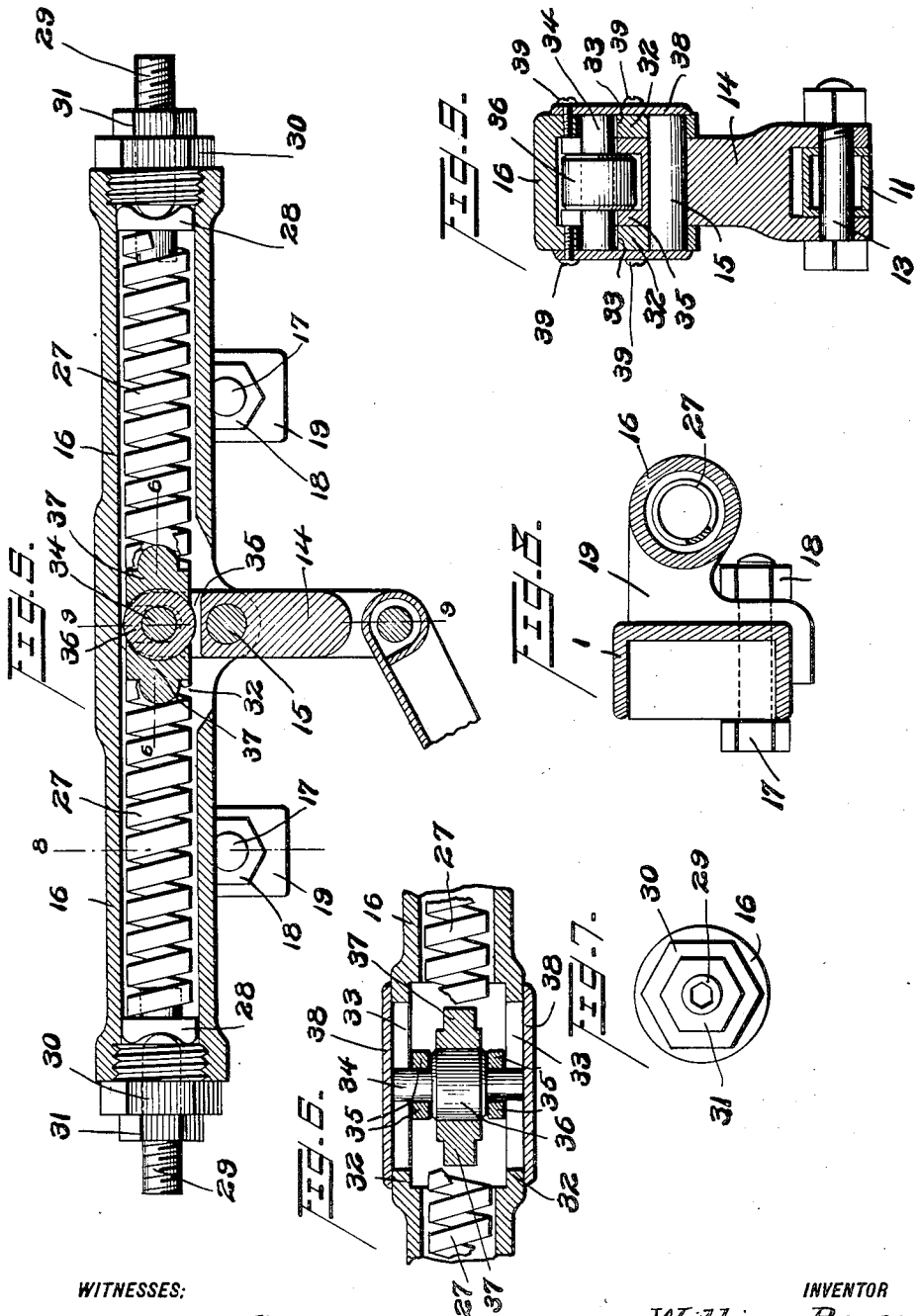

WILLIAM ROPER, OF PHILADELPHIA, PENNSYLVANIA.

VEHICLE-SPRING.

1,094,933.  Specification of Letters Patent.  Patented Apr. 28, 1914.

Application filed July 17, 1913. Serial No. 779,412.

*To all whom it may concern:*

Be it known that I, WILLIAM ROPER, a citizen of the United States, residing at Philadelphia, in the county of Philadelphia and State of Pennsylvania, have invented certain new and useful Improvements in Vehicle-Springs, of which the following is a specification.

My invention relates to improvements in vehicle springs, the object of the invention being to provide an improved spring support which is particularly adapted for use on automobiles, and which utilizes relatively small coiled springs to cushion the support.

A further object is to provide improvements of this character which are neat and attractive in appearance, comparatively inexpensive to manufacture, and strong and durable in use.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is an end view of Fig. 1, the frame bar being shown in sections. Fig. 3 is a plan view of Fig. 1. Fig. 4 is a view in longitudinal section on an enlarged scale illustrating the axle supported spring housing and coöperating parts. Fig. 5 is a view in longitudinal section on an enlarged scale illustrating the frame supported spring housing and its coöperating parts. Fig. 6 is a fragmentary view in longitudinal section on the line 6—6 of Fig. 5. Fig. 7 is an end view of the housing shown in Fig. 5. Fig. 8 is a view in section on the line 8—8 of Fig. 5, and Fig. 9 is a view in section on the line 9—9 of Fig. 5.

1 represents a frame bar such as commonly used on automobiles, and 2 is a link pivotally connected at one end as shown at 3 to the bar 1, and at its rear end pivotally connected by a bolt 4 with the forward end of a spring housing 5. This spring housing, centrally between its ends on its upper face, is made with a half bearing 6 to receive an axle 7, and secured in place thereon by a half bearing 8 which is clamped to the housing by bolts 9 and nuts 10 as clearly shown. The housing 5 therefore extends in front and in rear of the axle, and to the housing 5 at its rear end, a link 11 is pivotally connected by means of a bolt 12.

The rear end of link 11 is pivotally connected by a bolt 13 with a short lever 14, the latter being fulcrumed between its ends on a pin 15 supported in a spring housing 16 secured to bar 1 by means of bolts 17 and nuts 18, the bolts 17 being projected through bars 1 and through integral brackets 19 on housing 16. These brackets 19 also serve to space the housing 16 from the bar and maintain the same in the same vertical plane as the housing 5 and links 2 and 11 as clearly shown in Fig. 3.

The housing 5 is preferably rectangular exteriorly in cross section, but is provided with a cylindrical longitudinal bore 20 divided into two chambers by an internal annular integral flange 21 located centrally of the housing and against which two coiled springs 22 bear at their inner ends. Cushion blocks 23 are located at the outer ends of the springs 22, and are engaged by screw-threaded pins 24 in arms 25 riveted to links 2 and 11 respectively. In fact, the arms 25 are integral parts of castings which have bearings for the pivot bolts 4 and 12 respectively constituting the pivotal connection of links 2 and 11 with housing 5.

The pins 24 are adjustable and are secured against accidental movement by jam nuts 26. The housing 16 is of general rectangular form in cross section at its center, but throughout the greater portion of its length at both ends is cylindrical for the accommodation of coiled springs 27 having cushion blocks 28 bearing against their outer ends and engaged by adjustable screw-threaded pins 29. These pins are adjustable in plugs 30 which are screwed into the ends of the housing, and the pins are secured against accidental movement by jam nuts 31.

The sides 32 of housing 16 at the center thereof are provided with circular openings to receive the pin 15 and above said circular openings, the sides 32 are formed with longitudinal slots 33 to permit movement of a pin 34 which is located within the forked upper end 35 of lever 14. This lever 14, at its upper end, is forked or bifurcated in two directions so as to accommodate a roller 36 supported on the pin 34 and located between cushion blocks 37 having curved inner faces to engage roller 36. These cushion blocks 37 engage the inner ends of the springs 27 and the pressure of said springs normally holds lever 14 in a vertical position. Covering plates 38 are secured to the sides of the housing 16 by means of screws 39, and these plates cover the ends of pins 34 preventing any longitudinal movement of the pins and maintaining them in operative position.

In operation, the movement of the axle 7 toward the frame 1 or vice versa compels the links 2 and 11 to swing on their pivots. As the frame 1 moves downwardly, the arms 25 will compress springs 22. At the same time, link 11 will swing the lower end of lever 14 to the right of Figs. 1 and 5, thus moving the upper end of lever 14 and roller 35 to the left of Fig. 5, compressing the left hand spring 27. An upward movement of frame 1 moves the parts in the opposite direction, and as the springs 27 nicely balance one another, they prevent undue vibrations and cushion the rebound so that the springs not only support the vehicle, but act as a shock absorber as well.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a vehicle frame and an axle, of a spring housing secured to the axle, a second spring housing secured to the frame, springs in said housings, a lever fulcrumed between its ends in the last-mentioned housing and engaging the springs in the latter, a link pivotally connecting one end of the first-mentioned housing with the frame, a second link connecting the other end of said first-mentioned housing with the lever, and arms on said links engaging the springs in the first-mentioned housing, substantially as described.

2. The combination with a vehicle frame and an axle, of a spring housing secured to the axle, a second spring housing secured to the frame, springs in said housings, a lever fulcrumed between its ends in the central portion of the last-mentioned housing, a roller supported by the upper end of said lever and movable longitudinally in the housing, blocks at opposite sides of the roller engaging the springs in the said housing, a link connecting one end of the first-mentioned housing with the frame, a second link connecting the lower end of the lever with the other end of said first-mentioned housing, and devices on said links engaging the springs in the first-mentioned housing, substantially as described.

3. A vehicle spring comprising a housing adapted to be secured to a frame, and having registering openings and longitudinal slots in the sides thereof, pins in said openings and slots respectively, a lever fulcrumed between its ends on the pin in said openings, and having a forked end engaging the pin in the slots, and a roller on said last-mentioned pin, blocks at opposite sides of the roller, blocks in the ends of the housing, coiled springs between said blocks, and said lever at its lower end adapted to be connected to an operating link, substantially as described.

4. A vehicle spring comprising a housing adapted to be secured to a frame, and having registering openings and longitudinal slots in the sides thereof, pins in said openings and slots respectively, a lever fulcrumed between its ends on the pin in said openings, and having a forked end engaging the pin in the slots, a roller on said last-mentioned pin, blocks at opposite sides of the roller, blocks in the ends of the housing, coiled springs between said blocks, plugs screwed into the ends of the housing, pins adjustable in the plugs and bearing against the last-mentioned blocks, whereby the tension of the springs may be varied, and jam nuts screwed onto said pins against the plugs, substantially as described.

5. A vehicle spring comprising a housing, a lever fulcrumed between its ends to the housing, one end of said lever forked in both directions and located within the housing, a pin supported in the forked end of said lever, a roller on the pin within the forked end of said lever, springs in the housing at opposite sides of the lever, blocks located between the roller and the springs, and means for adjusting the tension of the springs, substantially as described.

In testimony whereof I have signed my name to this specification in the presence of two subscribing witnesses.

WILLIAM ROPER.

Witnesses:
M. E. DITTUS,
CHAS. E. POTTS.